United States Patent [19]
Pucillo

[11] Patent Number: 5,884,955
[45] Date of Patent: Mar. 23, 1999

[54] HANDLE GRIP AND GRIP ASSEMBLY

[75] Inventor: Barry Pucillo, Glendale Heights, Ill.

[73] Assignee: American Louver Company, Skokie, Ill.

[21] Appl. No.: 896,842

[22] Filed: Jul. 18, 1997

[51] Int. Cl.⁶ .......................... A45C 13/26; B65D 25/32
[52] U.S. Cl. .......................................... 294/171; 294/169
[58] Field of Search .................................. 294/137, 152, 294/153, 156, 166, 169, 170, 171; 16/114 R, 114 B; 220/752, 755, 759, 760, 772, 773; 383/6, 13, 25

[56] References Cited

U.S. PATENT DOCUMENTS

| | | | |
|---|---|---|---|
| 935,364 | 9/1909 | Gillespie | 294/152 X |
| 1,337,518 | 4/1920 | Kelly | 294/169 X |
| 1,468,848 | 9/1923 | Wear | |
| 3,912,140 | 10/1975 | Franges | 294/171 X |
| 4,071,063 | 1/1978 | Russell | 294/171 X |
| 4,590,640 | 5/1986 | Enersen | |
| 4,923,235 | 5/1990 | Stewart | |
| 4,932,702 | 6/1990 | Sweeny | 294/171 |
| 4,936,619 | 6/1990 | Salazar | |
| 4,982,989 | 1/1991 | Sweeny | |
| 5,029,926 | 7/1991 | Dieterich, Jr. | |
| 5,083,825 | 1/1992 | Bystrom et al. | 294/171 |
| 5,088,667 | 2/1992 | Olson | 294/171 X |
| 5,150,938 | 9/1992 | Gans | |
| 5,651,575 | 7/1997 | Bystrom et al. | 294/137 X |

FOREIGN PATENT DOCUMENTS 5305954  11/1993  Japan .................................... 294/170

Primary Examiner—Johnny D. Cherry
Attorney, Agent, or Firm—Richard G. Lione; Brinks Hofer Gilson & Lione

[57] ABSTRACT

A handle grip and handle grip assembly for shopping baskets. A pair of identical handle grips are fabricated of molded plastic, each comprising a unitary body component and cover component connected by a hinge component. A handle element is seated in each body component and the corresponding cover component closes over the handle element and is locked to the body component. The cover components of the grips engage each other when the basket is carried and the weight of the basket increases the engagement force.

11 Claims, 3 Drawing Sheets

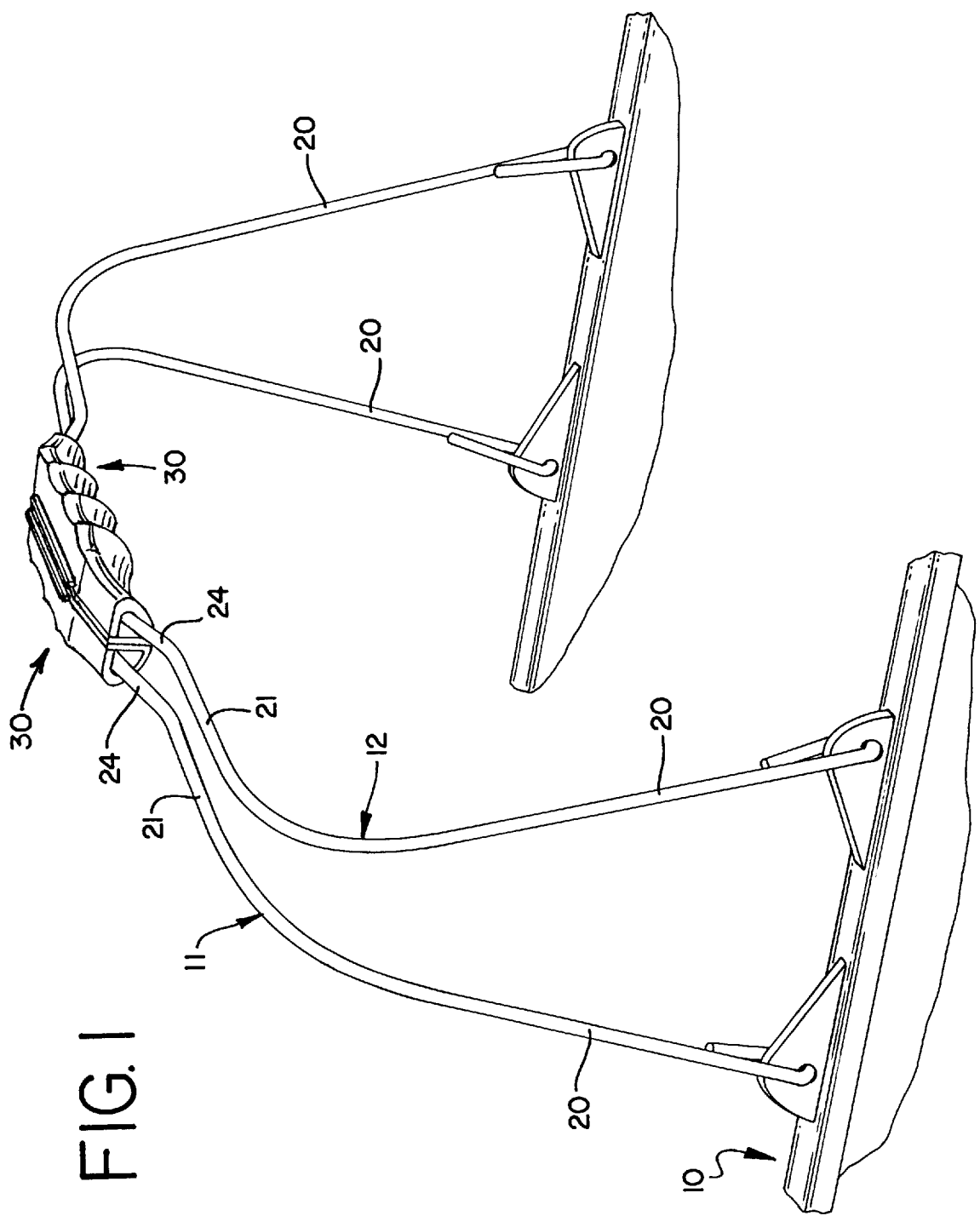

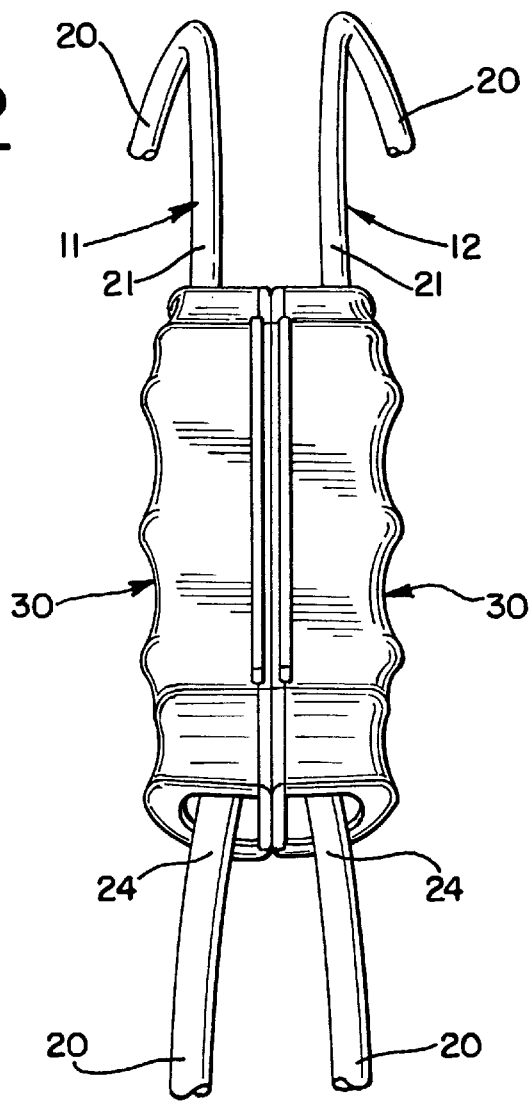
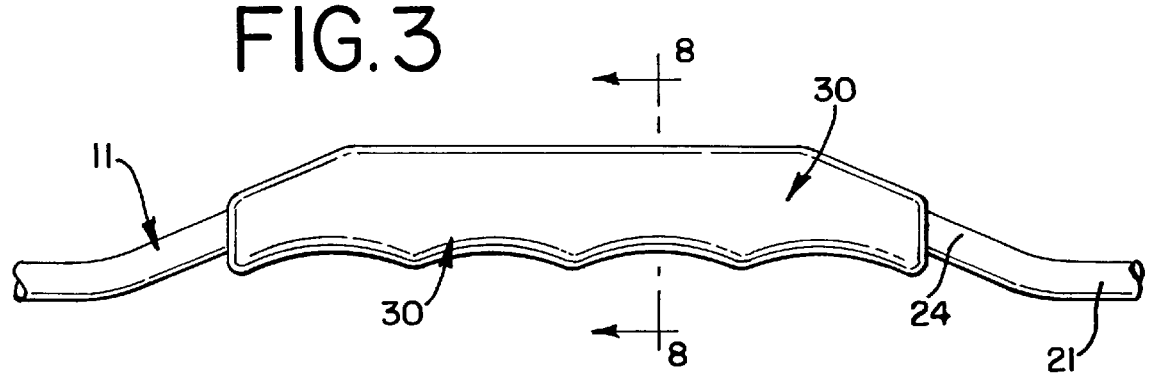

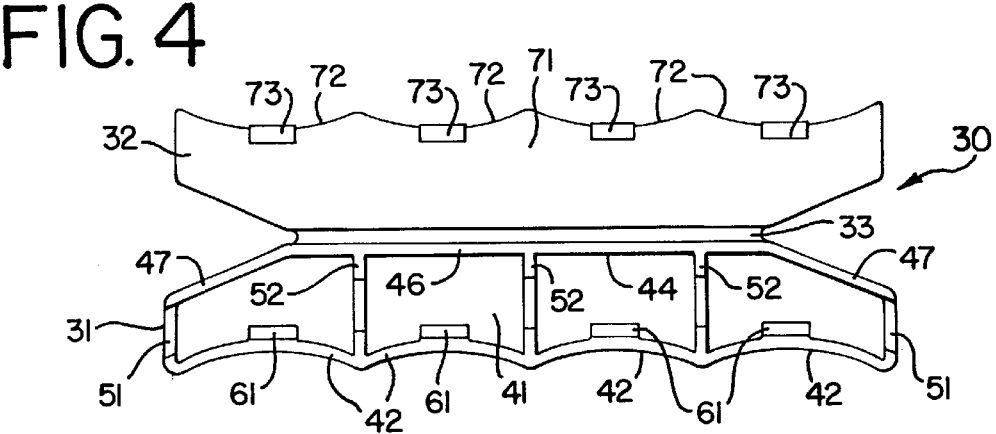
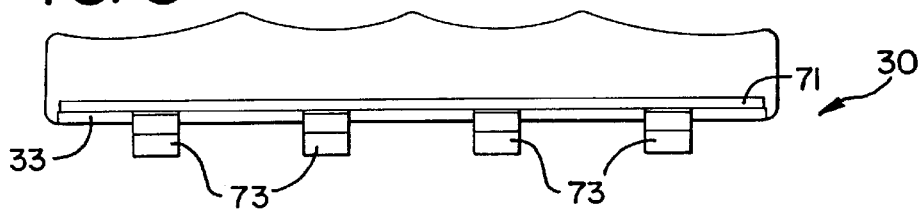
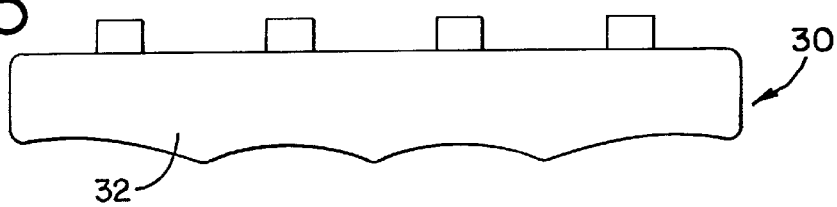
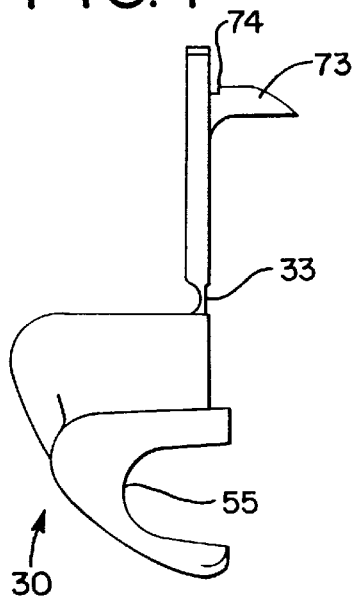
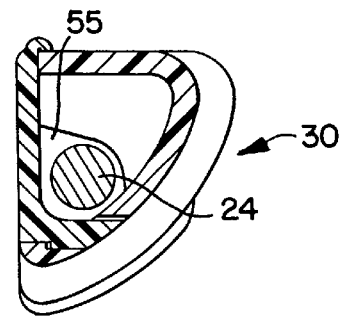
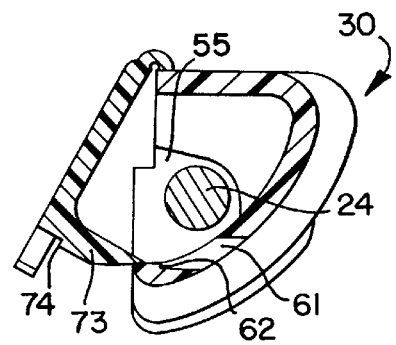

5,884,955

HANDLE GRIP AND GRIP ASSEMBLY

FIELD OF THE INVENTION

This invention relates generally to a handle grip for wire handle containers and the like. It relates particularly to a handle grip for shopping basket handles.

BACKGROUND OF THE INVENTION

Hand carried shopping baskets are popular with customers in grocery stores, for example, where smaller quantities of goods are involved, i.e., where wheeled shopping carts are unnecessary. Conventional baskets have two wire handles, each in an inverted U-shaped configuration, pivotally connected to a basket rim in spaced relationship. The basket might be fabricated of wire, itself, although molded plastic baskets are now widely used.

To carry the basket, the two basket handles are brought together and gripped by the shopper in a well-known manner. The basket can be carried easily and little, if any, discomfort is caused by the wire in the shopper's hand when the basket is empty or only lightly loaded. When the basket is loaded, however, its weight causes the wire handles to painfully press into the shopper's hands because forces are concentrated.

Of course, there have been numerous force dispersion handle grips designed for wire handles in the same or similar environments. An example is illustrated in the Sweeny U.S. Pat. No. 4,932,702. None affords a high degree of shopper comfort while still being simple, inexpensive and highly reliable, however. The present invention is directed toward overcoming the shortcomings of the prior art.

SUMMARY OF THE INVENTION

A primary object of the present invention is to provide a new and improved handle grip for shopping basket handles or the like.

Another object is to provide a one-piece, molded plastic handle grip which closes and locks securely on each wire handle of a shopping basket.

Yet another object is to provide a handle grip which is mounted so that the force exerted on the grip during use serves to further prevent opening of the handle.

Still another object is to provide a handle grip which is simple and inexpensive in construction.

A further object is to provide an improved handle grip assembly for two handles on a shopping basket.

The foregoing and other objects are realized in accord with the present invention by providing a clam-shaped, one-piece, molded plastic handle grip which closes and locks securely on each wire handle or bail of a shopping basket. The grips associated with the two handles abut each other when they are grasped in the shopper's hand to carry the basket. This force exerted on the grips causes each grip to remain securely closed and, in fact, as the load in the basket increases the force holding the grip closed increases. The size and shape of each grip, and the assembly of grips, obviates shopper discomfort normally associated with carrying a loaded basket.

BRIEF DESCRIPTION OF THE DRAWINGS

The invention, including its construction and operation, is illustrated more or less diagrammatically in the drawings, in which:

FIG. 1 is a perspective view of a shopping basket whose two wire handles are fitted with handle grips embodying features of the present invention;

FIG. 2 is an enlarged perspective view of the handle grip assembly formed when the handles and grips shown in FIG. 1 are grasped and held by a shopper;

FIG. 3 is a further enlarged front elevational view of a single handle grip embodying features of the invention, in its closed and locked position on a portion of wire handle;

FIG. 4 is a side view of the grip in its open position;

FIG. 5 is a top view of the grip in its open position;

FIG. 6 is a bottom view of the grip in its open position;

FIG. 7 is an end view of the grip in its open position;

FIG. 8 is an enlarged sectional view through a mounted handle grip taken along line 8—8 of FIG. 3; and FIG. 9 is a sectional view similar to FIG. 8 showing the grip in the process of being closed on a wire handle of a basket.

DESCRIPTION OF THE PREFERRED EMBODIMENT

Referring to the drawings, and particularly to FIGS. 1 and 2, a conventional shopping basket is seen generally at 10. The basket 10 is fabricated of molded plastic, and is adapted to be carried by a shopper through the medium of two U-shaped (inverted) wire handles 11 and 12. As will be seen, each handle 11 and 12 includes a pair of legs 20 pivotally connected to the basket 10, and a base 21 connecting the legs.

Each handle 11 and 12 is fabricated in a conventional manner from either 8 or 9 gauge steel wire. The wire base 21 of each handle 11 and 12 has an offset section 24 at its mid-point, and a handle grip 30 embodying features of the invention is mounted on it. The handle grips 30 for both handles come together in flush, mating relationship when they are gripped by a shopper, as seen in FIG. 2.

Referring now to FIGS. 4–7, a handle grip 30 is shown in its open configuration, i.e., as it appears after fabrication and before mounting on a basket handle 11 or 12. The grip 30 is molded in one piece of plastic using conventional techniques. In the preferred embodiment, the plastic used is a polypropylene.

The handle grip 30 comprises an elongated body component 31 and a correspondingly elongated cover component 32 joined by a somewhat shorter, but still elongated, hinge component 33. The body component 31 is 4 inches long, 0.750 inches deep and 0.598 inches wide in the embodiment illustrated. The cover component 32 is slightly shorter and slightly narrower, for reasons which will hereinafter become apparent.

The body component 31 comprises a combined outer side wall and bottom wall 41 which is scalloped along its length to create four indentations 42 for receipt of the four fingers of a shopper's hand. The wall 41 is arcuate in cross-section along its length. The radius of the arc varies, however, depending upon the position on the wall 41 in relation to the four indentations 42.

The body component 31 also comprises a top wall 44 which joins the combined outer and bottom wall 41. The top wall 44 includes an elongated central wall section 46 and bracketing outer wall sections 47. The central wall section 46 and bracketing outer wall sections are each flat. However, the outer wall sections are inclined downwardly relative to the central wall section 46, as best seen in FIG. 4.

The body component 31 also comprises two end walls 51, and three internal compartment walls 52 which lie parallel to the end walls. The compartment walls 52 provide structural rigidity to the body component 31.

The end walls 51 and the compartment walls 52 each have a roughly semi-circular depression 55 formed therein, as best seen in FIG. 7. These depressions 55 collectively define a receptacle for the offset section 24 of each wire handle, the insertion of which will hereinafter be discussed in detail.

Piercing the arcuate outside and bottom wall 41, in a horizontal path at each of the four scalloped indentations 42, are four locking ports 61. Each of the four locking ports 61 includes a vertically oriented locking lip 62 (see FIG. 9). The operation of the ports 61 and corresponding locking lips 62 will hereinafter be discussed in the context of the assembly of the handle grip 30.

Turning now to the cover component 32 of the grip 30, it will be seen to have a configuration corresponding to that of the inner, exposed side of the body component 31. As such, it comprises a flat wall 71 which has scalloped outer indentations 72. Extending perpendicular to the wall 71, at the base of each indentation 72, is a locking tab 73. Each locking tab 73 has a locking shoulder 74 formed on its lower surface, the purpose of which (as hereinafter discussed) is to mate with a corresponding locking lip 62 in the arcuate outside and bottom wall 41.

The components 31 and 32 are formed unitarily with, and joined by, the hinge component 33, as has been pointed out. The hinge component 33 is approximately one-half the thickness of the walls 41 and 44 making up the components 31 and 32, as will be seen. In this regard, the walls 41 and 44 are approximately ⅛ inch thick and the hinge component 33 is approximately 1/16 inch thick in the handle grip 30 illustrated. The cover component 32 pivots on the hinge component 33 to mate with the body component 31 and form a flat inner side wall for the handle grip 30.

Referring now to FIGS. 3, 8 and 9, in addition to FIGS. 1–7, a grip 30 is shown as it is being closed and locked onto a wire handle section 24 (FIG. 9) and as it appears when locked on (FIGS. 3 and 8). The wire section 24 is first seated in the depressions 55 formed in end walls 51 and compartment walls 52 of the body component 31. The cover component 32 is then closed over the body component 31.

As the cover component 32 closes, the hinge component 33 bends, acting as a hinge. The locking tabs 73 enter corresponding locking ports 61. The locking shoulders 74 pass by, and snap behind, corresponding locking lips 62. As best seen in FIG. 8, the cover component 32 is then permanently locked closed over the body component 31. The tabs 73, in entering the locking ports 61, bend outwardly in elastic deformation until their shoulders 74 pass the lips 62, when they return to their undeformed shape, creating the locking effect described.

The external dimensions of the cover component 32 are such that it nests inside the body component 31, as best seen in FIGS. 4 and 8. As such the cover component 32 nests between portions of the two end walls 51 of the body component 31.

The handle grips 30 for each handle 11 and 12 are identical. However, as will best be seen in FIG. 2, they are oriented 180° from each other when mounted on corresponding handle sections 24. As such, the cover components 32 of two grips 30 engage each other when the basket 10 is lifted. As the basket 10 is loaded, the grips 30 are pressed tightly together. The effect is that the only forces acting on the grips 30 serve to maintain their closed relationship with the handles 11 and 12, rather than disturb it.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

We claim:

1. A handle grip for a container handle wherein the container handle includes an elongated handle element, the handle grip comprising:
    a) a body component and a cover component connected by a hinge component, said components being formed unitarily from plastic;
    b) said body component including a top wall which has a flat section;
    c) said body component also including a combined outer side wall and bottom wall which extends downwardly and inwardly from joinder with said top wall;
    d) said body component further including a receptacle formed therein and extending the length of said body component for receiving the handle element;
    e) said cover component being substantially flat and being pivotable on said hinge component from a position where said body component is open to receipt of said handle element to a position where said cover component mates with said body component and forms a flat inner side wall for the handle grip;
    f) a locking element on said body component and a locking element on said cover component;
    g) said locking elements cooperating with each other when said cover component is closed onto said body component to lock said cover and body components together.

2. The handle grip of claim 1 further characterized in that:
    h) said locking element said cover component includes a locking tab which is one of a plurality of locking tabs thereon;
    i) said locking element on said body component includes a locking port which is one of a plurality of corresponding locking ports formed therein;
    j) said locking tabs adapted to be received in said locking ports when said cover component is closed.

3. The handle grip of claim 2 further characterized in that:
    k) each of said locking tabs has a locking shoulder formed thereon and each of said locking ports has a locking lip formed therein;
    l) said lips and shoulders mating when said cover component is closed to lock said cover component in place.

4. The handle grip of claim 2 further characterized in that:
    h) said outer side wall and bottom wall having a plurality of scallopped indentations therein.

5. The handle grip of claim 4 further characterized in that:
    i) each of said locking ports is formed in a scallopped indentation.

6. The handle grip of claim 1 further characterized in that:
    h) said combined outer side wall and bottom wall being arcuate in cross-section and curving downwardly and inwardly from joinder with said top wall.

7. The handle grip of claim 6 further characterized in that:
    i) said body component also includes two end walls, one of which joins the top wall and combined outer side wall and bottom wall together at each of the two ends of said body component.

8. A handle grip assembly for a container having a pair of container handles wherein each of the container handles includes an elongated handle element, the assembly comprising:

a) a pair of substantially identical handle grips;

b) each of said handle grips including a body component and a cover component connected by a hinge component, said components being formed unitarily from plastic;

c) said body component in each handle grip including a receptacle for receiving a handle element;

d) a handle element seated in each of said receptacles;

e) said hinge components permitting said cover components to move from a position where said body components are open to receipt of a handle element to a position where said cover components mate with corresponding body components and close corresponding cover components over corresponding handle elements; and f) a locking clement on each body component and a locking element on each cover component;

g) said locking elements cooperating with each other when said cover components are closed onto said body components to lock corresponding cover and body components together;

h) said cover components engaging each other so as to hold both said grips in closed relationship when said handle grip assembly is gripped to carry the container.

9. The handle grip assembly of claim 8 further characterized in that:

i) each of said body components includes an arcuate outer side wall and bottom wall joined by a top wall;

j) said cover components mating with corresponding outer side walls and bottom walls and top walls of said body components to close said cover components onto said body components.

10. The handle grip assembly of claim 9 further characterized in that:

k) said locking elements on said cover components including a locking tab which is one of a plurality of locking tabs thereon;

l) said locking elements on said arcuate outer side walls and bottom walls including a locking port which is one of a plurality of corresponding locking ports formed therein;

m) said locking tabs and locking ports cooperating with each other to lock corresponding cover and body components together.

11. The handle grip assembly of claim 8 further characterized in that:

i) each of said cover components includes a flat wall;

j) said flat walls engaging each other when said handle grip assembly is gripped.

* * * * *

UNITED STATES PATENT AND TRADEMARK OFFICE
CERTIFICATE OF CORRECTION

PATENT NO.      : 5,884,955
DATED           : March 23, 1999
INVENTOR(S)     : Barry Pucillo It is certified that error appears in the above-identified patent and that said Letters Patent is hereby corrected as shown below:

Claims

Claim 2,
Line 2, after "element", please insert -- on --.

Claim 4,
Line 1, please change "2" to -- 3 --.

Signed and Sealed this

Twenty-first Day of August, 2001

Attest:

NICHOLAS P. GODICI
Attesting Officer        Acting Director of the United States Patent and Trademark Office